United States Patent
Bahuguni et al.

(10) Patent No.: US 10,041,477 B2
(45) Date of Patent: Aug. 7, 2018

(54) DE-ICING OF A WIND TURBINE BLADE

(71) Applicant: VESTAS WIND SYSTEMS A/S, Aarhus N (DK)

(72) Inventors: Anand Bahuguni, Singapore (SG); Ravi Kandasamy, Singapore (SG); Voon Hon Wong, Singapore (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 454 days.

(21) Appl. No.: 14/366,559

(22) PCT Filed: Dec. 14, 2012

(86) PCT No.: PCT/DK2012/050471
§ 371 (c)(1),
(2) Date: Jun. 18, 2014

(87) PCT Pub. No.: WO2013/091642
PCT Pub. Date: Jun. 27, 2013

(65) Prior Publication Data
US 2015/0125297 A1    May 7, 2015

Related U.S. Application Data

(60) Provisional application No. 61/578,239, filed on Dec. 21, 2011.

(30) Foreign Application Priority Data

Dec. 21, 2011   (DK) .................. 2011 70739

(51) Int. Cl.
*F01D 5/08* (2006.01)
*F03D 11/00* (2006.01)
*F03D 80/40* (2016.01)

(52) U.S. Cl.
CPC .......... *F03D 11/0025* (2013.01); *F03D 80/40* (2016.05); *F05B 2260/20* (2013.01); *Y02E 10/72* (2013.01); *Y02T 50/675* (2013.01)

(58) Field of Classification Search
CPC ................... F03D 80/40; F03D 80/60
See application file for complete search history.

(56) References Cited

U.S. PATENT DOCUMENTS 4,976,397 A * 12/1990 Rudolph ................ B64D 15/04
                                                         244/134 B
5,011,098 A *  4/1991 McLaren ............... B64D 15/04
                                                         244/134 B (Continued)

FOREIGN PATENT DOCUMENTS

CN    1470764 A    1/2004
CN    1705823 A    12/2005

(Continued)

OTHER PUBLICATIONS

International Search Report for PCT/DK2012/050471, dated Apr. 3, 2013.

(Continued)

*Primary Examiner* — Logan Kraft
*Assistant Examiner* — Jason Fountain
(74) *Attorney, Agent, or Firm* — Patterson + Sheridan, LLP

(57) ABSTRACT

A heating assembly for a blade of a wind turbine generator, the heating assembly comprising: a heat reservoir positioned within a cavity of the blade, the heat reservoir in communication with a heat source; the heat reservoir including a plurality of orifices for venting hot air from the heat reservoir.

17 Claims, 4 Drawing Sheets

(56) References Cited

U.S. PATENT DOCUMENTS

| | | | |
|---|---|---|---|
| 5,807,454 A | 9/1998 | Kawabe et al. | |
| 6,675,881 B1* | 1/2004 | Rago | F28D 7/106 138/38 |
| 6,890,152 B1* | 5/2005 | Thisted | F03D 80/40 416/1 |
| 7,217,091 B2* | 5/2007 | LeMieux | F01D 11/00 415/905 |
| 8,029,239 B2* | 10/2011 | Luetze | F03D 15/05 416/91 |
| 8,186,964 B2* | 5/2012 | Bell | B29C 65/48 416/226 |
| 2004/0041408 A1* | 3/2004 | Casazza | F03D 9/002 290/55 |
| 2005/0242233 A1 | 11/2005 | Battisti | |
| 2006/0018752 A1 | 1/2006 | Lemieux | |
| 2008/0219851 A1* | 9/2008 | Althoff | F03D 1/0675 416/226 |
| 2008/0315152 A1* | 12/2008 | Daly | C09K 5/10 252/73 |

FOREIGN PATENT DOCUMENTS

| | | |
|---|---|---|
| CN | 1727673 A | 2/2006 |
| DE | 19621485 A1 | 3/1998 |
| DE | 102010051293 A1 | 5/2012 |
| DE | 102010051297 A1 | 5/2012 |
| EP | 1375913 A1 | 1/2004 |
| GB | 486549 A | 6/1938 |
| WO | 2011/127995 A1 | 10/2011 |

OTHER PUBLICATIONS

Danish Search Report for PA 2011 70739, dated May 1, 2012.
Chinese Search Report for Application No. 2012800676263 dated May 13, 2016.

* cited by examiner

DE-ICING OF A WIND TURBINE BLADE

FIELD OF THE INVENTION

The invention relates to wind turbine generators (WTG's) used in the generation of electricity. In particular, the invention relates to means of removing ice from a rotor blade of a wind turbine generator.

BACKGROUND

Blade de-icing is critical in WTG because there is a 20% to 50% increase in the loss production factor. Ice accretion on wind turbine blades causes:
- Change in aerodynamic shape resulting in significantly reduced power production
- Increased root loads and reduced blade life
- Unbalanced mass on the rotor plane
- Danger of ice throw from the blades In the case of melting ice, the principal characteristic is the surface-ice interface temperature which has to be above freezing. When melting occurs at the blade surface-ice interface, chunks of ice fall off as a result of wind and gravity forces.

The amount of heat and the time required to melt the ice depends on numerous factors. These include the thickness of the ice layer, the loss of heat from the external surfaces of the blade, the external ambient temperature, and most importantly, the efficiency of the method for transferring the heat from the source to the frozen areas.

SUMMARY OF INVENTION

In a first aspect the invention provides a heating assembly for a blade of a wind turbine generator, said heating assembly comprising: a heat reservoir positioned within a cavity of said blade, said heat reservoir in communication with a heat source; said heat reservoir including a plurality of orifices for venting hot air from said heat reservoir.

The underlying principle involves the use of hot air applied to the blade so as to heat of a surface of the blade and consequently de-ice the surface. In particular, the hot air may be applied to a portion of the blade adjacent to the leading edge of said blade. In a still further embodiment, hot air may be applied to the blade adjacent to both the leading edge and the trailing edge. Ice that is removed from the leading edge may migrate around the blade and re-freeze on the trailing edge. By providing hot air to the trailing edge, this migrating ice may be prevented from re-freezing and so prevented from re-forming.

The heat reservoir may be a separate device within the blade, mounted to the spar of the blade or constructed to be part of the spar. The hot air venting from the heat reservoir may exit through a plurality of orifices directly into a cavity of the blade and so heat the surface adjacent to the external portion of the cavity. Said orifices may be formed within the heat reservoir, or may simply be drilled.

Alternatively, each orifice may be connected to a duct for directing the flow of hot air to a specific portion of the blade, such as adjacent to a leading edge of the blade, should it be desired to concentrate the heat at that point for maximum effect. Further, the hot air may be directed to the leading edge, on the basis that de-icing a first third of the blade span, that is that third of the blade measured from the blade point, may have the greatest beneficial effect on torque generated by the blade. In this way, the additional weight of the structure may be minimized, while still ensuring effective de-icing of the aerodynamically important part of the blades. Such a concentration of hot air on a portion of the blade, such as the final third of the leading edge may be a thermally efficient method for de-icing, and may assist in providing a uniform heating zone and so avoiding cold spots which may not effectively remove said ice.

Such an arrangement may lead to a short heating time and low power output. It may also allow heating when the blades are stationary or moving, which may prevent down time of the wind turbine generator. It may also allow either continuous heating which may act as a preventive measure or intermittent heating when required.

To accelerate the flow of air venting from the heat reservoir, the heat reservoir may include one or more fans for directing the air flow through the plurality of orifices. Alternatively, or in addition to, each orifice may include a fan for accelerating the flow of air within said orifice. This may be particularly useful where the orifices are connected to ducts for directing the air flow to specific portions of the blade.

In a further embodiment, the ducts to which the orifices are connected may be constructed of a heat conductive material such as aluminium nitride or boron nitride. Said ducts may also have relatively thick walls.

BRIEF DESCRIPTION OF DRAWINGS

It will be convenient to further describe the present invention with respect to the accompanying drawings that illustrate possible arrangements of the invention. Other arrangements of the invention are possible and consequently, the particularity of the accompanying drawings is not to be understood as superseding the generality of the preceding description of the invention.

DETAILED DESCRIPTION

Figure 1:
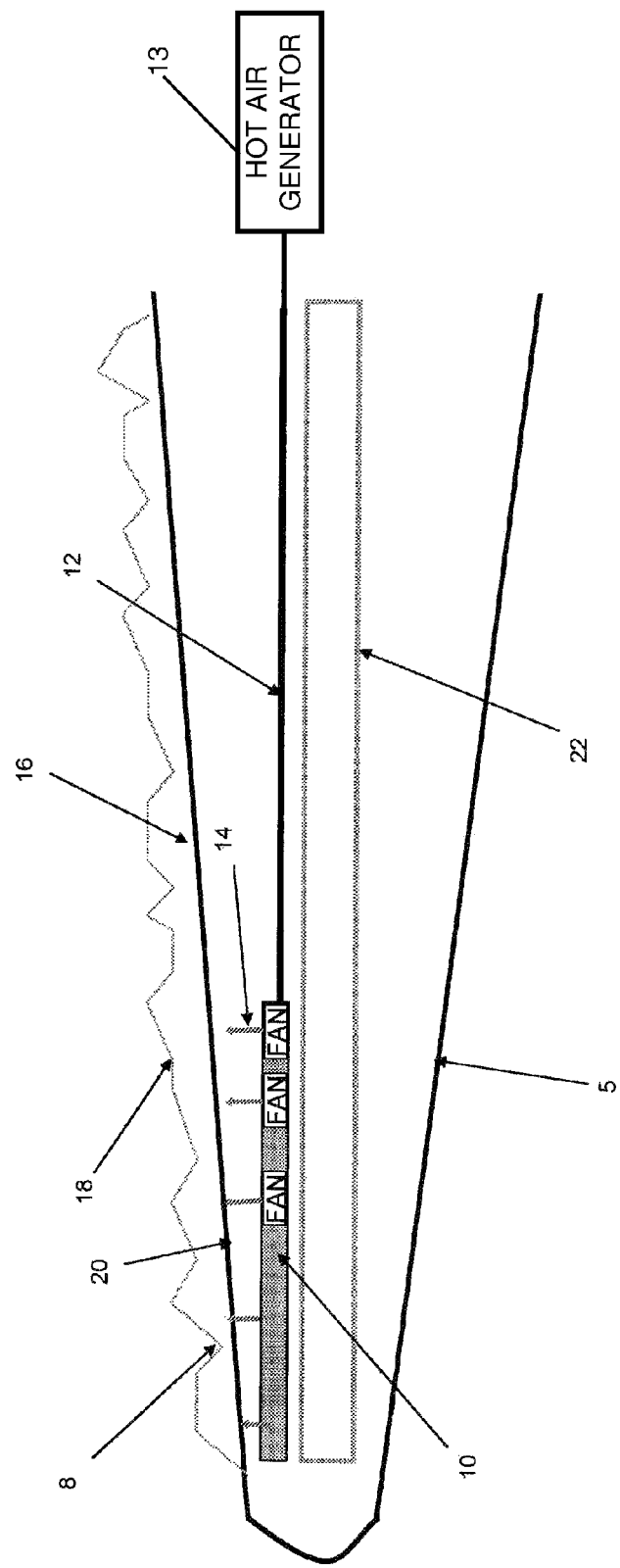
FIG. 1 is a cross sectional view of a wind turbine generator blade having a heat assembly according to one embodiment of the present invention.

FIG. 1 shows a wind turbine generator blade 5 in cross section. The blade 5 includes a spar 22 to provide Structural support for the blade and mounted to it is a heat reservoir 10 for receiving a flow of hot air through an insulated duct 12. Said duct 12 is connected to a hot air generator 13, for instance a fan or pump flowing air across a heating element. Alternatively, waste energy from the wind turbine generator, such as within the nacelle, may also provide a source of heat.

Projecting from the heat reservoir 10 is a plurality of ducts 14 delivering hot air to a leading edge 20 of the blade. In so doing, the hot air heats the leading edge 20 sufficiently to allow the removal of ice 18 that has formed over the leading edge, through to partially melting and falling away from the blade so as to better provide performance.

Under freezing conditions, an accretion of ice 18 may build up on the leading edge of the blade so as to change the shape as well as add mass in an unbalanced arrangement to the blade, severely affecting the performance of the wind turbine generator. The intention is to remove the ice from the blade so as to improve performance hence the addition of the heat assembly 8. The aerodynamic performance of the blade 5 depends upon a clear unimpeded profile for the leading edge 16 of the blade.

In a further embodiment, the projecting ducts 14 may also have relatively thick walls constructed of a heat conducting material such as aluminium nitride or boron nitride so as to provide both heat convection, through the flow of hot air to the leading edge, as well as heat conduction through the thick wall duct 14.

The arrangement of the heat reservoir allows hot air being delivered through the insulated duct 12 to heat a thermal mass within the heat reservoir, such as a thick wall or block made from a heat conductive material. It will therefore retain heat sufficiently to provide hot air to be delivered to the leading edge. The hot air may rely on a pressured differential due to the inflow of hot air through the duct 12. Alternatively, a fan or compressor arrangement within the heat reservoir 10 may generate a flow of hot air so as to flow through the plurality of orifices to which the ducts 14 are connected.

Figure 2:
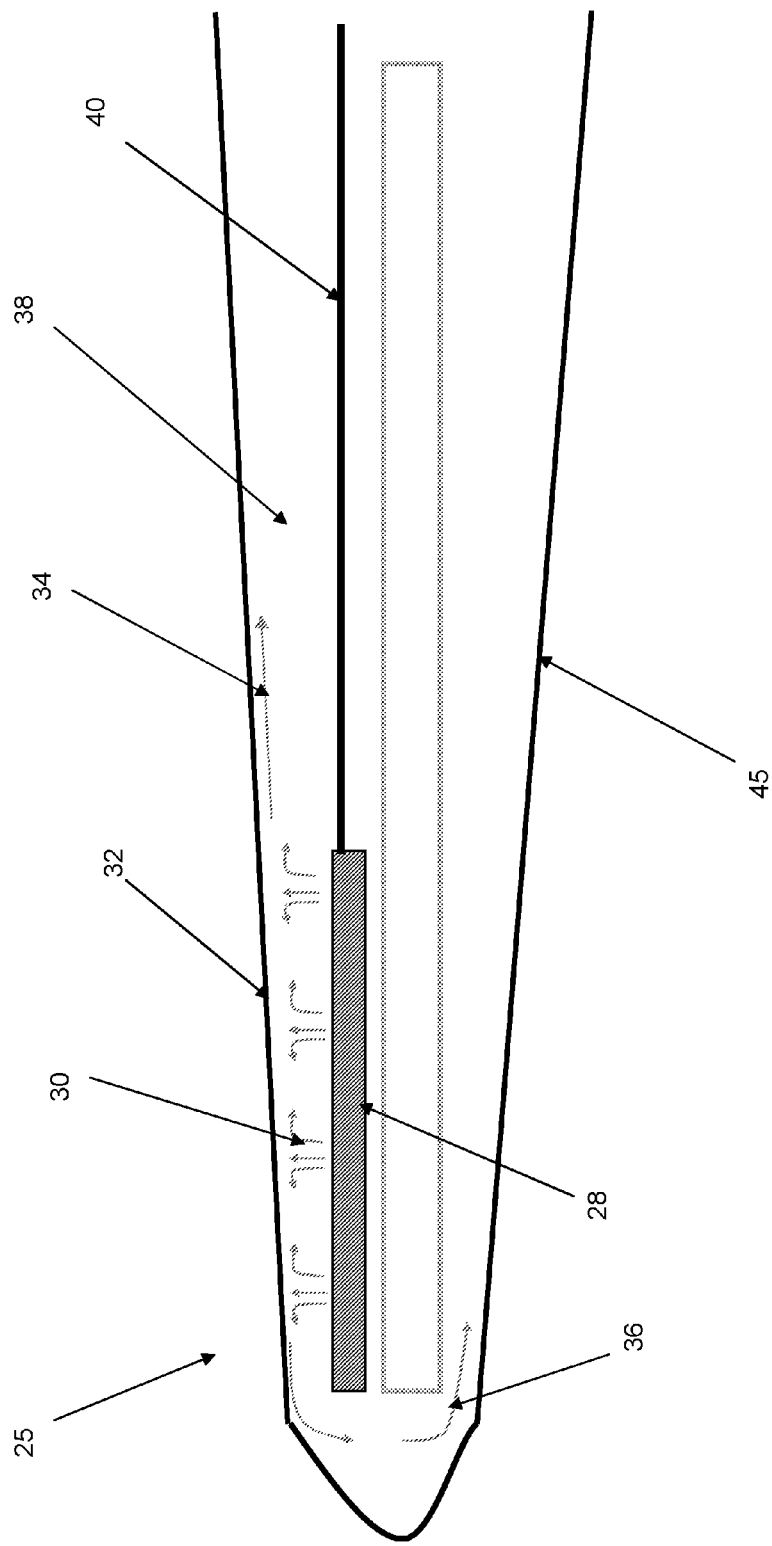
FIG. 2 is a cross sectional view of a wind turbine generator blade having a heat assembly according to a further embodiment of the present invention.

FIG. 2 shows an alternative arrangement of the heat assembly 25 whereby a heat reservoir 28 receives hot air through a duct 40 and then vents the air 30 through a plurality of orifices or recesses into the cavity, or void 38, of the blade 45. As a result, the hot air flows 34, 36 into and around the void 38 so as to elevate the temperature of the entire blade. Thus, whilst the arrangement of FIG. 1 focuses on removing ice from a portion of the blade such as the first third of the blade which has a greater influence on the blade torque. Instead, the arrangement according to FIG. 2 heats the entire blade so as to remove ice from the entire length of the leading edge. In a further embodiment, the cavity into which the hot air is vented may be relatively small, such as corresponding to the final third of the blade. To this end, the blade cavity 38 may be compartmentalized to fit with the desired heating requirements of the heating assembly.

A further advantage of both embodiments is that the de-icing methods can be used when the blade are either stationary or rotating. Thus, no downtime of the turbine is required in order to remove ice which permits intermitted use of the heat assembly as required or continuous use so as to provide a preventive measure to prevent the build-up of ice.

Figure 3:
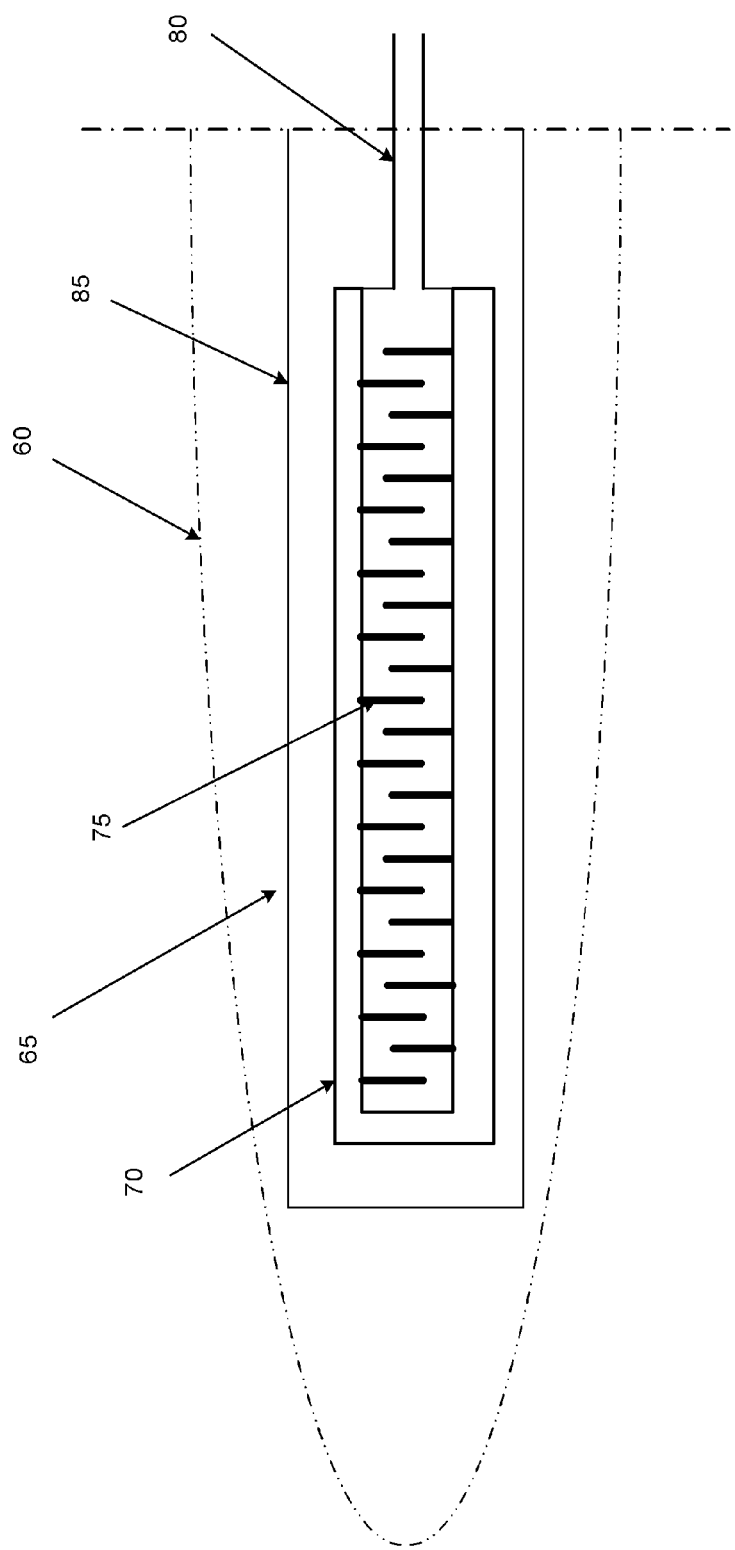
FIG. 3 is a cross section view of a heat reservoir according to a further embodiment of the present invention.

FIG. 3 shows one possible arrangement of the heat reservoir 65. Here, a hollow container 70 having sufficiently thick walls to provide a thermal mass and defining a void/cavity therein. Within the cavity is an array of heat transfer fins 75 arranged to receive heat from a heat source. In this embodiment the heat source is hot air delivered to the heat reservoir 70 through an insulated hot air duct 80.

The heat reservoir 65 is mounted to a spar 85 acting as a structural element within a blade 60. The heat reservoir 65 is located within a final third of the blade 60 with the orifices for venting the hot air, or ducts connected to said orifices (not shown for clarity), having as short a path as possible from the heat reservoir 65 to the leading edge of the blade.

Figure 4:
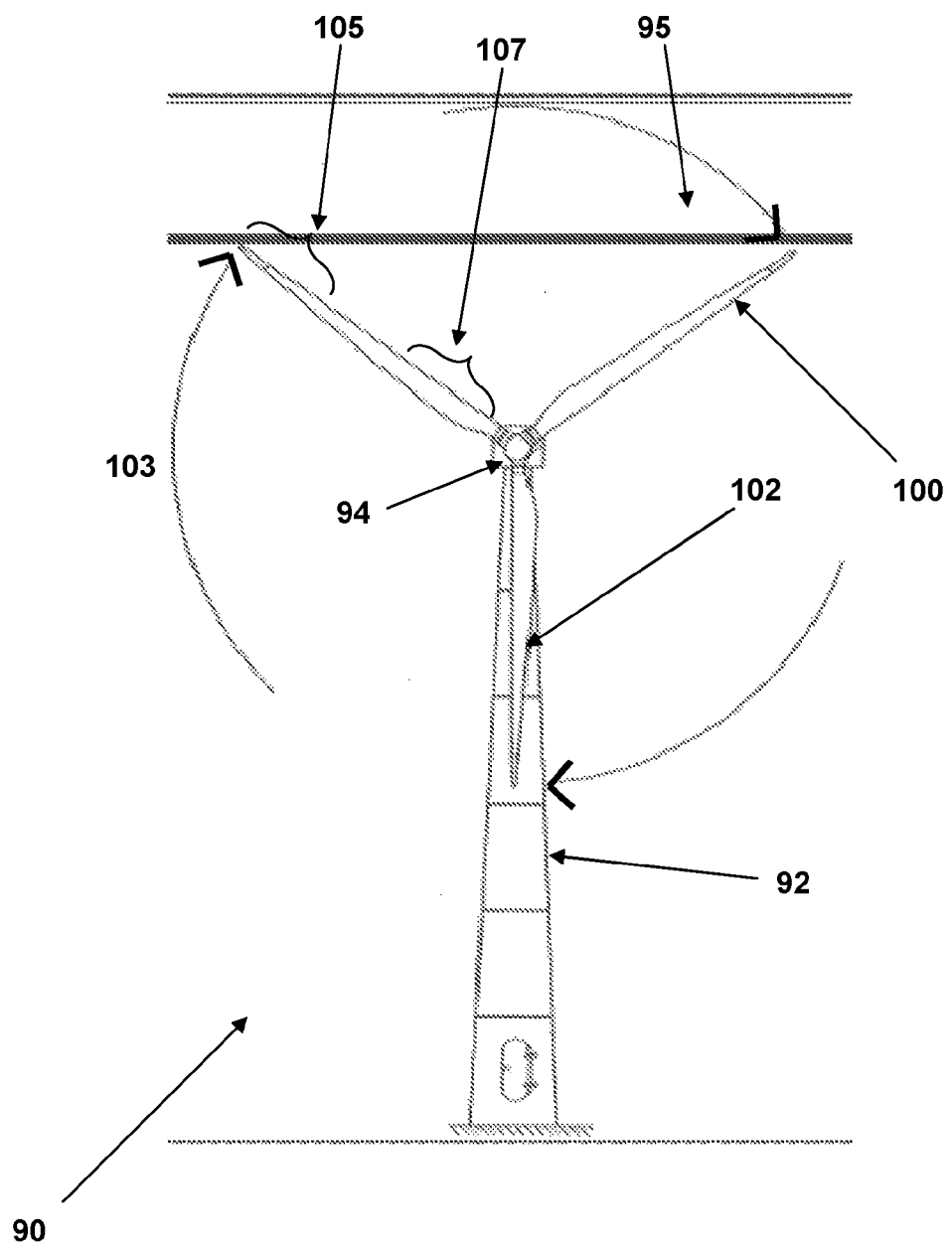
FIG. 4 is an elevation view of a wind turbine generator for receiving a heat assembly according to the present invention.

FIG. 4 shows a wind turbine generator 90 into which the heat assembly may be mounted. A heat generator (not shown) may be mounted in the nacelle 94 or the tower 92 supporting the nacelle, subject to the form of the heat generator. This may include a heating coil through which hot air is passed, or a hot water interface heated by solar thermal energy. The particular form the heat generator does not limit the invention, and many such generators of heat may be used to provide sufficient heat to operate the heat assembly.

The blades 95 into which the heat assembly is mounted include a leading edge 100, about which the ice forms. The blade further includes a first third 105 which, by virtue of the distance from the nacelle will have the greatest influence on the torque of the blade, and the final third 107, allowing the most efficient application of heat to the blade.

What is claimed is:

1. A heating assembly in a blade of a wind turbine generator, said heating assembly comprising:
    a heat reservoir positioned within a cavity of the blade and mounted to a spar of the blade, wherein the heat reservoir is coupled with a hot air generator via a duct for delivering hot air, wherein the duct is at least partially located within the cavity of the blade;
    wherein the heat reservoir comprises a plurality of orifices for venting hot air from the heat reservoir and wherein the heat reservoir does not extend a full length of the spar; and
    wherein the heat reservoir comprises a heat retaining thermal mass for heating air, the heat retaining thermal mass constructed of at least one of aluminum nitride and boron nitride.

2. The heating assembly according to claim 1, wherein the plurality of orifices are arranged to vent the hot air into the cavity.

3. The heating assembly according to claim 1, wherein at least one of the plurality of orifices is configured to deliver hot air from the heat reservoir to a portion of the blade.

4. The heating assembly according to claim 3, wherein the portion of the blade includes an inner portion of the blade corresponding to a leading edge of the blade.

5. The heating assembly according to claim 1, wherein the heat reservoir includes a fan for accelerating a flow of hot air through the plurality of orifices.

6. The heating assembly according to claim 1, wherein the plurality of orifices includes a respective fan for accelerating a flow of hot air through each of the plurality of orifices.

7. The heating assembly according to claim 1, wherein the cavity of the heat reservoir comprises an array of heat transfer fins arranged to receive heat from a heat source.

8. The heat assembly according to claim 1, wherein the hot air generator comprises a fan blowing air across a heating element.

9. The heating assembly according to claim 8, wherein the heating element comprises at least one of a heating coil, and a hot water interface heated by solar energy.

10. The heating assembly according to claim 1, wherein the heat reservoir is positioned between a tip of the blade and a first third of the length of the blade.

11. A wind turbine comprising a nacelle having a plurality of blades connected thereto and a hot air generator, wherein each of the plurality of blades comprises a respective heating assembly, wherein each of the heating assemblies comprises:
    a heat reservoir positioned within a cavity of the blade and mounted to a spar of the blade, wherein the heat reservoir is coupled with the hot air generator via a duct for delivering hot air, wherein the duct is at least partially located within the cavity of the blade;
    wherein the heat reservoir comprises a plurality of orifices for venting hot air from the heat reservoir and wherein the heat reservoir does not extend a full length of the spar; and
    wherein the heat reservoir comprises a heat retaining thermal mass for heating air, the heat retaining thermal mass constructed of at least one of aluminum nitride and boron nitride.

12. The wind turbine according to claim 11, wherein the plurality of orifices are arranged to vent the hot air into the cavity.

13. The wind turbine according to claim 11, wherein at least one of the plurality of orifices is configured to deliver hot air from the heat reservoir to a portion of the blade.

14. The wind turbine according to claim 13, wherein the portion of the blade includes an inner portion of the blade corresponding to a leading edge of the blade.

15. The wind turbine according to claim 11, wherein the heat reservoir includes a fan for accelerating a flow of hot air through the plurality of orifices.

16. The wind turbine according to claim 11, wherein the plurality of orifices include a respective fan for accelerating a flow of hot air through each of the plurality of orifices.

17. The wind turbine according to claim 11, wherein the cavity of the heat reservoir comprises an array of heat transfer fins arranged to receive heat from a heat source.

* * * * *